Figure 1:
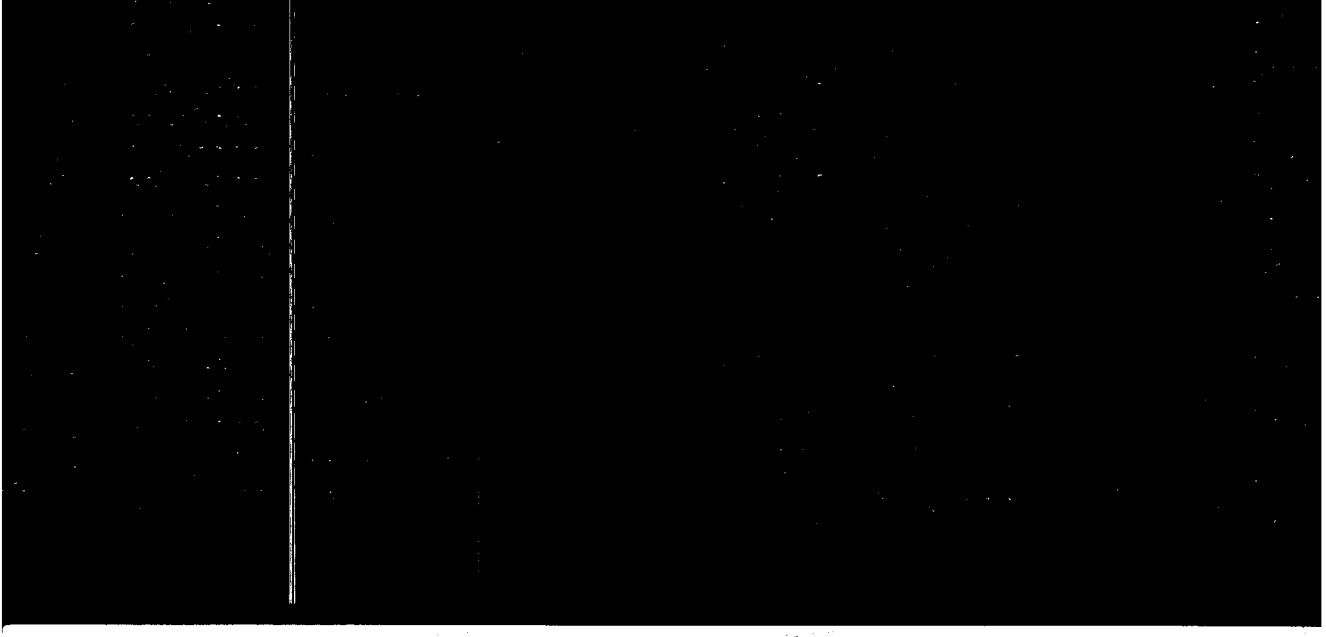

Sheet 2, 3 Sheets.

D. Treadwell.
Making Cannon.

Nº 4,589. Patented Jun. 20, 1846.

Witnesses

Inventor
Danl Treadwell

Sheet 3, 3 Sheets.

D. Treadwell.
Making Cannon.

N° 4,589. Patented Jun. 20, 1846.

Witnesses:
Wm Dehon
Willard Phillips

Inventor.
Danl Treadwell

UNITED STATES PATENT OFFICE.

DANIEL TREADWELL, OF CAMBRIDGE, MASSACHUSETTS.

MACHINERY FOR WELDING AND FORMING WROUGHT-IRON CANNON.

Specification of Letters Patent No. 4,589, dated June 20, 1846.

*To all whom it may concern:*

Be it known that I, DANIEL TREADWELL, of Cambridge, in the county of Middlesex and State of Massachusetts, engineer, have invented a new and useful method of making cannon, (by which term I mean to include all kinds of ordnance, such as mortars, howitzers, carronades, culverins, falcons, swivels, &c., as these names merely designate different sizes and forms of cannon,) together with various tools, instruments, and machinery for making said cannon, which invention or inventions I specify and describe as follows, viz:

The material or materials of which my improved cannon are made are wrought iron or steel, or wrought iron and steel; which are first formed into separate rings or short hollow cylinders, which rings being joined together, end to end, in sufficient numbers, constitute the body of the cannon.

To give a complete knowledge of the machinery invented by me and the method of using the same, I will, before describing the method of making the separate rings, describe the method of uniting or joining the rings together and the tools and machinery invented for the purpose of so uniting and joining them.

Let it be supposed, then, that I have already formed, in a manner to be hereafter described, twenty-four rings or hollow cylinders each of which has an interior diameter of about six inches, a length of about five and a half inches, and that the external diameters vary from nine to fourteen and three quarter inches, that is, that one, the smallest, ring has an external diameter of nine inches, another of nine and a quarter, another of nine and a half inches, and so on, increasing about a quarter of an inch each, until the twenty-fourth ring reaches a diameter of fourteen and three quarters inches or thereabouts. The twenty-four rings, of these sizes, would be such as are required to form the body of a cannon to carry a shot of thirty-two pounds, the length of the caliber of said cannon being about six feet.

It will be understood that I do not confine my invention to any particular sizes or proportions of rings, and that rings of other dimensions than those above given will be required for cannon of other sizes.

To put the rings, above described, together, and form the body of the cannon I use the machinery represented in the drawings hereto annexed.

Figure 2:
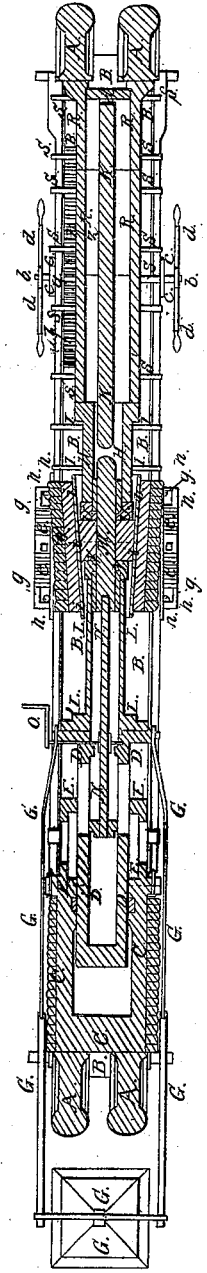

Figure 1, is a longitudinal section of such machinery, shown in elevation. Fig. 2, a plan of the same machinery in section. Figs. 3 and 4 are cross sections, made through parts which will be hereafter described.

A A A A represents the frame of an hydrostatic press, the upright pieces (Fig. 1,) being heavy pieces of cast iron, and the horizontal pieces being bars of wrought iron. The top bars are supported by straps passing around deep pieces of timber. B B a large cast iron bed plate having two rails projecting upward, as shown at Figs. 3 and 4 in cross section, upon which the chairs, to be hereinafter described, can be moved lengthwise. C C cylinder of press; hooped with wrought iron. D D piston or ram of press (seen in cross section at Fig. 3). The piston or ram has a cylindrical cavity, running nearly through it. E E a cast iron guide box bolted to the head of the cylinder, which guides and directs the piston in its motions forward and backward. F F pipe leading from the pumps of the press to the cylinder, for conducting the water to and from the cylinder. The pumps are not shown in the drawings, but are like the ordinary pumps of an hydrostatic press. G G system of connecting rods, bent levers, and weight, by which the piston or ram is drawn backward when the water is discharged from the press. H H a piece of cast iron, which I call a spindle, resting upon the cast iron chair I I. A hole somewhat larger than the caliber of the cannon, to be made, runs through this spindle; and one end of the round bar of iron or backing pin K K may be run through this hole. L L a spindle similar to H H, bolted upon the end of the piston. The mandrel or punch M M passes through this spindle. This mandrel is connected, as seen in the drawings, with the rack N N, one end of which passes into the cavity of the piston and can be moved backward and forward in that cavity by the crank and axle O O acting upon the pinion P. When the rack is passed out of the cavity of the piston it passes into the hole made through the spindle L L and carries the mandrel M M through and out of the spindle L L. This mandrel is somewhat conical being about one quarter of an inch larger at the end next to the rack than at the other end.

R R R R are blocks of cast iron forming three sides of a square, that is, having a bottom, and two sides projecting upward, so as to leave a rectangular cavity, in which the bar or backing pin K K lays along. Each block rests upon a chair, marked S S, &c.; the under side of each chair being notched upon the projecting rails of the bed plate B B so that it can slide upon the rails toward or from the cylinder. Upon the inside of the right hand block, as seen in the drawings, projections are formed against which the short bar of iron d may be placed, across the back end of the bar or backing pin K, which prevents the bar from passing backward, in operations to be hereinafter described. The place of the spindle H H upon the bed plate B B is always determined, as may be required, by the number and length of the blocks behind it.

U (Fig. 2) and U′ (Fig. 1) are sets of cast iron placed upon the end of the spindle H H and supported there by a ring which passes into the hole in the spindle H H and into the body of the set V V is a set similar to U and is supported upon the end of the spindle L L by a ring in the same manner that U and U′ are supported upon H H. The sets U, U′, and V are short cylinders of cast iron. Holes are made through the center of these sets which are large enough in every part to permit the mandrel M to pass through them. The back parts of these holes, that is, the parts next to the spindles H and L are enlarged so as to pass over portions of the rings which project from the ends of the spindles H and L. The faces of the sets U (Fig. 2) and V V (Figs. 1 and 2) are creased or furrowed. These furrows pass over the faces in the direction of rays, from a center, about a quarter of an inch apart and leave between them sharp projections which form creases in the hot iron, against which they are pressed, in the operations to be hereafter described. The face of the set U′ has a circular projection, (as seen in Fig. 1) which forms a circular depression in the hot iron against which it is pressed in the operations to be hereafted described. A number of sets similar in form to V V but of different external diameters, are required to suit the different diameters of the rings, and tapering form of the cannon. But the set U′ as seen in Fig. 1 upon the breech of the cannon is constantly used in that place that the projections upon the face of the set may keep the cannon in its proper position while the press is in operation upon it.

W W is the mold; being a hollow frustum of a cone made of cast iron and hooped with strong wrought iron hoops, as shown in the drawing, surrounding it. This mold rests upon a chair X X, which is notched on to the projecting rails of the bed plate which guide it when it is drawn toward or from the cylinder of the press. The chair rests upon the axles of four small wheels Y Y which run upon the same rails of the bed plate and facilitate its motion along the rails.

Z Z is a rack connected with the chair of the mold W W.

a a is a pinion upon the axle b b running in the bearings c c. This pinion is turned around by the arms d d fixed upon the axle b b and when so turned forces the rack Z Z and the chair and mold connected with it, toward or from the cylinder of the press. The ends of the axles of the wheels Y Y run in boxes which are pressed downward by the springs e e which are sufficiently stiff to bear the weight of the chair, the mold, and the cannon which is to be formed in the mold. The mold is secured upon the chair by the bars f f and the bolts g g the lower ends of which are hooked under the frames h h, seen at Fig. 4. These frames h h have small projections upon their inner sides which pass under the edges of the bed plate B B (seen at Fig. 4) and prevent the chair X X and the mold W W from being lifted from the bed plate.

i i i i are staves of wrought iron placed inside of, and running through the whole length of the mold. Several sets of these staves are required, of different thicknesses. The diameter of the cavity of the mold is determined by the thickness of the staves placed in it, as it will be perceived that the diameter of the cavity of the mold, or the cavity within the staves, may at any time be diminished by placing thicker staves within the mold.

The furnace required for heating the iron to be used in making cannon is placed at one side of the press, opposite the cylinder and at a convenient distance, say about six feet from the same. I use a reverberatory furnace, having a hearth about four feet square, with two doors, one on each side, opening to the hearth, and I urge the fire with a fan-blower driven by a steam engine. A crane is placed in such position that a pair of tongs suspended from it will bear the cannon or any part of the same from the furnace to the press where it is to be operated upon.

With the machinery herein described, being thus arranged I take the two largest of the wrought iron or steel rings described in the first part of this specification and place them in the furnace and heat them to a welding heat, I then place them near each other, end to end, and run a large iron bar through the inside of both of them. The end of this bar which is passed into the rings is nearly as large as the hole in the rings. I then by another bar, passed through the other door of the furnace, press or strike the rings gently together so that they will adhere to each other. In this, and in every other operation of putting the cannon together in the furnace, care must be taken that no sand or cinder be inclosed in the joint. This is avoided by having the bar which is inserted through the rings about fifteen feet long, and, being supported at a point near the door of the furnace upon a prop, or from a chain, as a fulcrum, the bar becomes a lever, the shorter arm, of which runs through the rings, in the furnace. Then by depressing the longer arm of the lever, the rings are, before they are pressed or driven together, lifted or raised from the hearth of the furnace. The rings being in this way made to adhere to each other are next, when at a welding heat, removed from the furnace by suitable tangs, suspended from the crane, and carried to the press and held between the sets U' and V (Fig. 1) the mold having been carried back against the piston D with the spindle L passing through its cavity. By turning the pinion P, by means of the crank O, the mandrel M is then thrust through the inside of the heated rings. The tongs are then removed and then, by means of the rack Z Z, the pinion a a and the arms d d, to which the power of men is applied, the mold is drawn rapidly forward so as to cover and inclose the rings (Instead of drawing the mold forward by the rack and pinion, as heretofore described, I have sometimes used the power of the falling weight. To do this I attach to the chair X X of the mold a chain, of sufficient strength for the purpose, which passes horizontally over the bed plate B and under the chairs S S to a point situated a few feet beyond the frame of the press. Here it passes under a pulley placed in a proper frame, from which it ascends and passes over another pulley arranged to receive it, about six feet above the first pulley, and is then connected with the weight, which should weigh about one thousand pounds, intended to move the chair and mold. To use this apparatus the mold must be placed near to the piston and held in that position by a hook or catch passing over the projection or flanch which forms the end of the piston; the weight being then elevated. Then when the rings or part of a cannon have been placed in the position to be operated upon by the press if the hook or catch be withdrawn from its connection with the piston, the weight will by its gravity descend and draw the mold toward the spindle H until it incloses the rings for the purpose of welding them as before described. A system of wheels and pinions with the other necessary parts, such as are used for raising the weight or ram of a machine for driving piles, may be used for raising this weight, herein described, when required, or it may be raised through its connections with the chair X X by the rack Z Z pinion a a and arms d d whenever those arms are turned for carrying the mold toward the piston.) The press is then put in motion and the set V approaching the set U' the rings are pressed between them and welded perfectly together. The mold at this time prevents the too great enlargement of the rings upon the outside and causes the rings to take the form of the inside of the mold or the staves which line it, while the mandrel M prevents the closing of the hole through them. The water is then drawn from the press, and the piston by means of its connection with the weight G, is drawn backward, carrying with it the spindle L and the set V. The backing pin K is then passed along through the spindle H H until its end meets the end of the mandrel M. Blocks of iron are then placed between the other end of the backing pin and the iron bar d. The press is then again put in motion and the end of the mandrel M presses against the backing pin K, while the rings are forced forward by the set V and are driven from a larger to a smaller part of the mandrel M and loosened so that the mandrel can be drawn out of them. The mold W, W is then moved backward by the rack and pinion before described and the rings, or ring, thrown from the mold. Should the rack and pinion, from any cause, prove insufficient to remove the ring from the mold, then, after the mold is carried backward so that the set U' is out of its cavity, blocks or bars may be placed between the set and the end of the mold, and the press being put in operation the rings will be forced by the set V from the cavity of the mold. Instead of placing the blocks or bars between the end of the mold and the set U' they may be placed between the mold and the projecting part, as seen in the drawing, of the spindle H H, or against any other projections upon the blocks R, and the same result will be produced. Having thus united the two rings as herein described I again place them in the furnace, as first described, and placing another, the next larger, ring in the same furnace, I proceed to unite this last to the two first. To do this, after all are raised to a welding heat I place the larger end of the single ring near the smaller end of the two, united, rings, and inserting the large lever bar, before described, through them I press or drive them slightly together, so that they will adhere to each other, I remove them, when welding hot, to the press and repeat upon them the operations before described as necessary for welding the first two rings. Having thus united three of the twenty four rings I proceed, in like manner, thus to unite ring after ring to those before united, until I have united the twenty four rings, first described, which will be sufficient for the body of the cannon intended to be made. Or, instead of following the order of operations, exactly, as here described, I have sometimes after uniting the first two rings, proceeded to unite two others, and then two others until I have united all the rings together, in pairs, or twos and twos, thus making twelve double rings. I have then proceeded to unite the double rings with each other until the body of the cannon was completed. This I now think will prove to be the best manner of proceeding in uniting the rings.

Fig. 2 shows the press in the act of uniting two rings as herein described.

It will be understood that whichever manner of proceeding is followed, when the part of the body of the cannon thus formed by uniting rings, becomes longer than the width of the hearth of the furnace, the end which was first formed is allowed, while the other end is heating, to project from the furnace door. So likewise the same end will project from the mold when the press is in operation, as is shown in Fig. 1. Further it will be understood, that, as the largest rings intended for the breech of the cannon, are first put together, as the smaller ones are united to it, the cavity of the mold is required to be gradually diminished, in diameter, to suit the tapering form of the cannon. This diminution of diameter is produced by taking out the staves from the inside of the mold and putting in their place other staves of greater thickness, or other molds having cavities of smaller diameters may be successively used one after another as shall be required to suit the varying diameter of the cannon, and in this way the use of staves may be wholly dispensed with. The sets V V must likewise be changed to suit the diameter of the cannon. When the part of the cannon formed has attained the length of about two feet, I find it convenient to substitute, for the tongs by which it had been carried from the furnace to the press, a cradle or frame of bars of iron suspended from the crane. This is formed by two bars about ten feet long, placed parallel to each other, about twenty inches apart, and secured together by crossbars. It is suspended from the crane at a point about two feet from the end which supports the cannon, and the other ends of the bars form handles to the cradle, by which the men move and direct it with the cannon upon it. To withdraw the cannon, or partly formed cannon, from the furnace I insert into the hole in its body a long bar of iron which is supported from a single point upon a carriage mounted upon four wheels which run upon the floor or upon a railway. The bar thus inserted into the cannon thus becomes a lever, with its shorter arm in the cannon, the point of support upon the carriage being its fulcrum, and its longer arm, passing over the carriage is acted upon by men, who, by means of it, raise the cannon and draw it from the furnace to a position where it can be embraced by the tongs, or supported by the cradle, suspended from the crane, before described, and carried to the press. By the same instruments, likewise, the cannon is moved from the press to the furnace, as the operations upon it may require. I have said in a former part of this specification that the pumps of the hydrostatic press are not shown in the drawing but they are like the ordinary pumps of an hydrostatic press. I find it convenient to use two sets of pumps, each set consisting of three pumps. The plungers or pistons of one set are one inch in diameter, having strokes six inches long. The plungers of the other set are three inches in diameter and have strokes nine inches long. Both sets of plungers or pistons are moved by cranks which are turned by the power of a steam engine, by means of belts which pass from a drum, driven by the engine, to and over pulleys which are connected with the cranks of the pumps. Each crank is connected with a fast and a loose pulley, and each belt may be moved at pleasure to the fast or to the loose pulley. When upon the former, the crank connected with it is turned round and the pumps are made to operate. When upon the latter, the crank is not turned by it, and the pumps or plungers remain at rest.

The guides, by which the belts are moved from one pulley to the other, are connected with two levers which are placed by the side of the press, near the cylinder of the same, so that a man, standing by the side of them, can, by means of them, at pleasure, move the belts from one pulley to the other, and thus cause either or both sets of pumps to be put in operation, or to rest. The same man likewise can, by means of another lever, which is connected with a valve or stopcock, hold the water in the press or cause it to be discharged from the same. Each set of pumps communicates by a pipe with the pipe marked F (Fig. 1) in the drawings, and upon the pipe thus leading from each set of pumps is placed a valve which is loaded with a weight and thus becomes a safety valve. I load the valve of the large pumps with such a weight that the valve is not raised until the pressure of the water gives a force of twenty tons to the press, and the weight upon the valve of the small pumps is, sometimes, such that it is not raised until the force of the press becomes equal to four hundred tons. This pressure I find sufficient to weld together and form the largest part of a cannon of the size which I have hereindescribed. When the smallest part of the same cannon is formed the pressure is reduced to two hundred tons. It is necessary to place in the course of the pipe leading from the large pumps to the pipe marked F (Fig. 1) a valve which shall close whenever the water is discharged, by the pressure from the safety valpe of the large pumps. The closing of this valve prevents the water from passing from the cylinder of the press, or from the small pumps, out of the safety valve of the large pumps. The effect produced by this valve may be produced by a stopcock or any similar apparatus. I have hitherto used in these operations a hydrostatic or bydraulic press as above described. The tools, instruments, and machinery invented by me for manufacturing cannon may, however, be connected with a screwpress, or a press of any other kind of sufficient power for the purpose. Or the force of impulse may be used instead of pressure and the necessary motions may be given by the percussion or collision of a heavy body. But I consider the hydrostatic press as above described to be the best.

Instead of following the exact method of joining the rings, which has been above described, they may be united in the following mode of operation. Two or more rings may be formed, in a method to be hereafter described, upon a solid cylinder or bar which is of a size equal to the hollow of the cylinder or cavity of the rings, or such two or more rings after having been formed, may be placed upon such solid cylinder, end to end. The rings and the bar or central solid cylinder contained within them are then to be heated to a welding heat and the rings welded to each other and likewise the two or more rings welded to the bar or central solid cylinder inclosed within them. If this operation of welding be performed in the mold heretofore described, the mandrel cannot be used, as the cavity, in the rings, will be occupied by the solid cylinder before described to the exclusion of the mandrel.

Another method, varying in a slight degrees from the above, is to form each ring upon a solid cylinder of a length equal only to the length of the ring or hollow cylinder, or to place the ring or hollow cylinder, after it has been formed, upon such short solid cylinder; thus making each ring into a solid cylinder of an external diameter identical with the external diameter of the ring. Two of these solid cylinders being then heated to a welding heat are to be placed, end to end and joined together as before described. Then by uniting other solid cylinders, formed in the same way, of rings inclosing a central solid cylinder or cylinders, piece or pieces, to those before united, a cylinder or frustum of a cone will be formed from which the body of a cannon may be made by drilling, boring, or turning out either altogether, or in part, the substance which constituted the bar or bars or solid cylinder or cylinders upon which the rings were formed, or upon which they were placed after they were formed.

Having thus described the machinery for making the body of a cannon by joining together rings, I will now proceed to describe the method of making the separate rings and the machinery which I have invented for that purpose.

Figure 5:
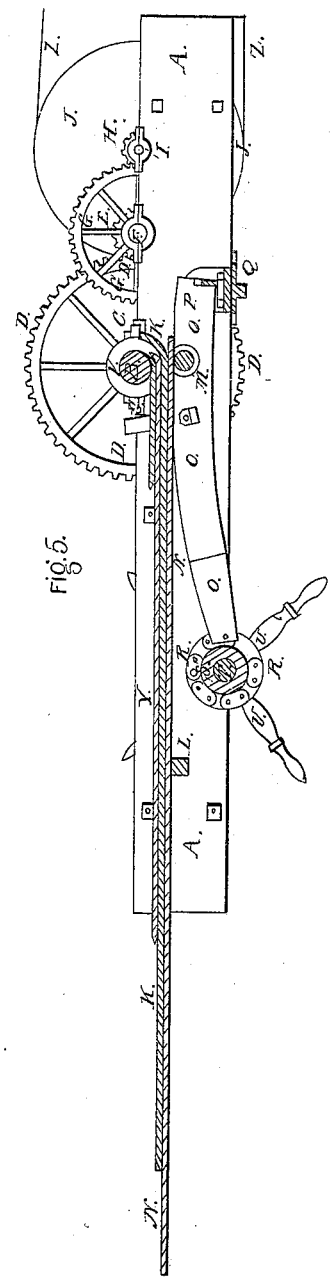
Figure 6:
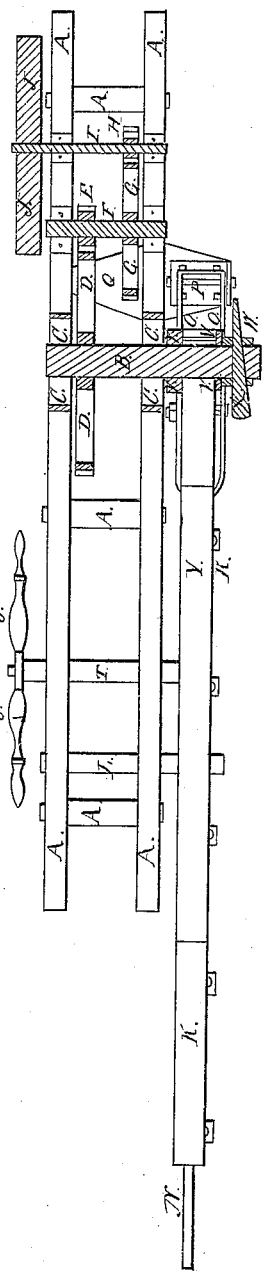

To form one of the rings heretofore mentioned as necessary to the construction of a cannon suitable for discharging shot of thirty two pounds, I take a bar of iron or steel or a bar of iron and steel about five and a half inches wide, twenty three inches long and one inch thick, and hammer each end into a wedgelike form, for a length of about two inches. One of these ends I make about six inches wide and bend it through a length of about three inches into an arc of a circle of three inches radius. Further operations upon it are performed by the machinery represented in Figs. 5 and 6, which machinery I will now describe. Fig. 5 represents, in longitudinal section, an elevation of the machinery. Fig. 6, a plan of the same machinery in section. A A A, &c., is the frame of the machinery which is made of wood. B a wrought iron shaft or spindle turning in the boxes C C. D D a cog-wheel by which the spindle is turned. E E a pinion upon the axle F which gives motion to the wheel D D. G G a cogwheel upon the same axle F. H a pinion upon the axle I I. J J a pulley upon the same axle I I. Both the axles F and I are fitted in proper boxes in which they turn, as will be seen in the figures. K K an iron table resting upon the support L L and the roller M. N a square bar of iron fixed to the under side of the table K and running in grooves in the support L and the roller M when the table is moved in the direction of its length to prevent the lateral motion of the table. O O O a large crotched bar or lever of iron, capable of turning upon the bolt P which passes through the two open or crotched parts of the bar O O and through projections which rise fro mthe body of the support Q, which is a large piece of cast iron bolted firmly to the frame A A. The bar O O is connected at its other end by the chain R R with the barrel S, which barrel is fixed upon the axle T T and can be turned around by the arms U U. When the barrel S is turned, and the chain wound up upon it, (as shown in Fig. 5) the end of the bar or lever O O connected with it is raised or elevated, the other end of the same being kept in place by the bolt P. The roller M which rests upon a bolt passing through its axis and through the two forks or arms of the lever O O is likewise raised, and carries with it the table K, one end of which rests upon and is borne by it. V V are rings surrounding the spindle B. The ring nearest the frame is fixed and immovable upon the sipndle, while that nearest the end can be moved upon the same spindle in the direction of the length of the spindle. These rings I call the gripping rings. W W a large ring likewise upon the spindle B near the end. X X a key or wedge which passes through a hole in the spindle B and the ring W. As this key or wedge is driven farther into or through the hole in the spindle the outermost gripping ring is carried nearer to the inner gripping ring. Y Y a bar of iron five and an half inches wide resting upon the table K K. Z Z a belt which being connected with a steam engine or any other power gives motion to the several wheels and shafts, as will be seen from their connections. With this machinery thus arranged, which I call the winding machinery, the formation of the bar, heretofore described, into a ring for making part of a cannon, is to be effected. That bar being heated is placed upon the bar Y Y resting upon the table K. The curved end is placed directly under and in contact with the spindle B. The arms U U are then turned until, by the elevation of the lever O the table K and the bar Y the end of the heated bar is pressed firmly against the spindle B, as shown in Fig. 5. The key X is then driven forcibly into and through the hole made for it in the ring W and the spindle B. By this operation the end of the bar is gripped and held forcibly between the gripping rings V V. The pulley J is then put in motion which turns the wheels and pinions connecting it with the spindle B which also turns and winds the heated bar into a circle which incloses that part of the spindle which is situated between the griping rings V V. During this motion the table moves along upon the roller M. When the bar is thus formed into a circle the lever O and the table are permitted to descend, by releasing the strain upon the chain. The key X is driven from the spindle and the ring W and the outermost gripping ring are removed from the spindle. The bar likewise which has now been formed into a circle is removed from the machine.

Figure 8:
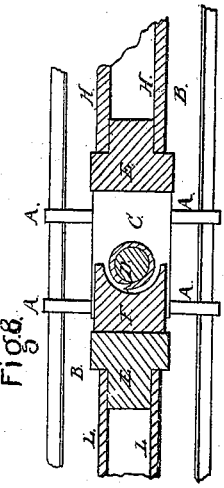
Figure 7:
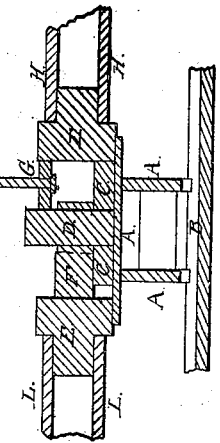

I find the table as herein described a useful though not an essential part of the machinery as the operation of forming a ring may be accomplished by bringing a roller like the roller M into immediate contact with the under side of the bar which is to be bent. Or, it may be accomplished by using, instead of a roller like M, a block of iron which shall have no motion around its axis and over which the heated bar shall be made to slide. Any change of that kind, however, would not alter the character of the machine. The bar, being thus bent into a circular form, is next to be welded, at its ends, thus forming a ring. To do this I use the machinery and tools represented in Figs. 7 and 8. Fig. 7 is a vertical, longitudinal, section of this machinery, shown in elevation. Fig. 8 is a plan of the same machinery, shown in section. This machinery is used in connection with the press heretofore described and B B represents a part of the bedplate of the press; L and H represent parts of the spindles L and H, as seen in Figs. 1 and 2. A A is an iron table standing upon the projecting rails of the bed plate. C C is a thick plate of cast iron having a hole through it, near its center, through which passes the lower end of the pin D, which is supported upon the top of the table A. E E are two sets; being square blocks of cast iron with plane faces. A cylindrical projection is formed upon the backside of the sets E and E. The projection of one of the sets passes into the hole in the spindle H and the projection of the other set passes into the hole in the spindle L, by which means the sets are supported by the respective spindles. F is a swage, or die, made of cast iron, the face of which forms about one third of a hollow cylinder, and is placed opposite to the pin D. G is a plate of cast iron suspended by a chain from any fixed point above it, and connected with the handle I. The part of this plate which is opposite the pin D forms part of a hollow cylinder corresponding to the diameter of the pin D.

I will now describe the manner of using this machinery. The bar of iron or steel, heretofore described as turned or bent into a circular form upon the spindle of the winding machinery, being heated in the furnace to a welding heat, is carried to the press upon which the machinery last above described has been arranged, and placed upon the pin D, with the tapering or wedge-like ends, which now lap over each other, between the pin D and the swage or die F. The plate of cast iron G is then placed between the pin D and the set, as seen at Fig. 7. The press is then put in operation, by which the spindle L is moved toward the pin D and, with it moves the swage or die F. By this motion the overlapping ends of the circular bar are pressed together and firmly welded to each other. During this operation it will be perceived that the pin D is kept stationary by the reaction of the plates of cast iron C and G which are pressed against the set E connected with the spindle H. When a ring has been thus welded the plate G is removed and the ring is taken from the pin. It will be understood that a sufficient number of blocks must be placed between the spindle H and the upright part of the frame of the press to preserve the spindle H immovably upon the plate. When a number of rings have been thus welded the plate G is taken away, and a swage or die similar to the swage or die F is placed upon the plate C, upon the side of the pin D that was before occupied by the plate G. One of the rings which has been welded, as before described, is then, after being moderately heated, placed upon the plate C over the pin D and between the swage or die F and the other swage or die. These swages or dies being then, by the action of the press, made to approach each other, the parts of the ring which are inclosed between them and the pin are pressed upon the pin and made to conform upon their inner sides to the shape of the pin and upon their external sides to the shape of the faces of the swages or dies. The press is then stopped and the swage or die F is moved from the ring. The ring is then turned one quarter around, and again subjected to the pressure of the swages or dies. Being thus acted upon successively in different parts, it is at length rounded and made to conform to the shape of the pin upon every part of its inner side. The pin and ring are then removed from the press, and the pin, being placed over a hole in a block of iron, is driven from the ring. It will be found that the pin will be more easily removed from the ring if, instead of being perfectly cylindrical, it be made in some degree conical or tapering.

A ring or hollow cylinder made of the bar of the bar of iron or steel, or iron and steel of the dimensions heretofore described and after the mode just above described will have an internal diameter of about six inches, an external diameter of about eight inches, a thickness of about one inch, and a length of about five and a half inches.

I will now proceed to describe the method by which I unite to the ring thus formed a further quantity of iron or steel so as to enlarge it to the dimensions of the rings, described in the first part of this specification, as suitable for making a cannon of the size there described. To add to the ring herein described such a quantity of iron or steel or of iron and steel, as shall make its external diameter, say, twelve inches. I take a bar, of the material or materials aforesaid, about sixty four inches long, five and a half inches wide, and one inch thick and reduce both its ends to a wedge-like form, one of the ends being made about six inches wide. This widest end is then bent into an arc of a circle of four inches radius, the length of the arc being three inches. One of the rings before described to which this bar is to be united, is then placed upon the spindle B, of the winding machinery, heretofore described and represented in the drawings Figs. 5 and 6. The bar above described which is to be united to this ring is then heated in any proper furnace and placed upon the table K of the winding machinery with its curved end beneath the ring upon the spindle B. The table K is then raised by the method of operation with the arms U U of the winding machinery which has been heretofore described. The concave side of the curved end of the bar is thus brought in contact with the outside of the ring. The key X is then driven into the hole made through the ring W and the spindle B. The gripping rings V, V, are thus made to press forcibly upon the part of the bar which is between them. Motion is then given to the spindle B by its connections through the various wheels and pinions with the pulley J J and belt Z Z. By this motion and the pressure, upwards, of the table, the bar is wound upon the ring and made to form two entire circumvolutions about the same; thus forming a spiral inclosing a ring. The spiral is then released from the gripping rings and with the inclosed ring is removed from the machine. The next operation is to weld together the contiguous parts of the spiral and form this and its inclosed ring into a hollow cylinder. To do which I place the same in the furnace and raise the same to a welding heat. I then place the same upon the plate C on the table A heretofore described, upon the press (represented in Figs. 7 and 8) with the pin D passing through the center of the same. Instead of the swage or die F and the plate G represented in Figs. 7 and 8 I place upon the plate C two swages or dies of a larger size. Each of the faces of these swages or dies forms a part of a hollow cylinder of six inches radius (other sizes being required for rings of other diameters). By pressing the heated iron forcibly between the faces of these swages or dies the several parts are welded together, and by causing the pressure to be made successively upon the different sides of the mass, it is rounded and formed into a cylinder or ring. It is then removed from the table with the pin D and the pin being placed over a hole in a block of iron is driven from the cylinder or ring. A ring made in this way of a bar of the size heretofore described upon a ring likewise of the size heretofore described will have an external diameter of about twelve inches. To make other rings such as may be required for forming cannon of different sizes, or the parts of different sizes, of the same cannon, it is only necessary to use bars thicker or thinner than that herein described, or to use bars longer or shorter than the said bar herein described, so that they shall make a greater or less number of circumvolutions about the inclosed ring. So the cylinders or rings may be made longer or shorter by using bars which are wider or narrower than those herein described.

Another method of making the rings is to bend or wind a bar of iron or steel, or of iron and steel, upon itself, into a spiral form in the same manner that I have herein described the bar as wound or bent about an inclosed ring. The contiguous parts of the spiral may then be welded together, without any ring inclosed within the spiral, and form a ring suitable to be united endwise to another ring, made in the same way, and thus form part of the body of the cannon.

Another method, which I have sometimes practiced of making the rings, is as follows. I make a number of rings of a thickness not more than equal to, say, one half of the walls or sides of the cannon to be made. These rings are of such diameters that the largest may be placed upon the outside of or over the smaller. I thus have a small ring encircled by or inclosed in a larger ring. These two rings may then be inclosed in a third, and still larger ring, and these three in a fourth, and so on, if necessary, to form the proper thickness for the cannon. Then be welding these contiguous rings together a single ring is formed suitable to be joined, endwise, to other similar rings, and thus form part of the body of the cannon. Or the rings may be made of single bars of the full thickness required for the walls of the cannon. The ring in this case will be formed by merely bending a bar of proper length and thickness into a circular form and welding its ends together. Of all these methods of making the rings, however, I consider that first above described, viz. by winding a bar spirally about a ring previously made, to be the best.

Rings made by either of the preceding methods may be placed upon a solid cylinder or solid cylinders when they are to be united together to form the body of a cannon, in a manner set forth in a former part of this specification. Or; rings of either of the preceding kinds may be formed upon the same solid cylinder to which they are to be united in the body of a cannon by placing said solid cylinder in the winding machine (represented in Figs. 5 and 6) in the place of the spindle B of said machine. With the machine thus arranged if the bar which is to be formed into a ring be heated and placed upon the table of the machine and gripped by sufficient instruments to the bar or solid cylinder which is to remain inclosed within it and then the cylinder be turned upon its axis, the bar which is intended to form the ring will be wound upon it in the same manner that it is wound, by the ordinary operation of the machine, upon the spindle B or upon a ring previously placed upon the spindle B.

Having thus formed the rings in the manner above described, and having joined them together in the method described in a former part of this specification, there is produced a hollow cylinder or rather a hollow frustrum of a cone suitable for forming the body of a cannon. The next operations required are to bore the hollow cylinder, or rather frustrum of a cone, to the proper size for the caliber of the cannon, and to close its breech by a proper pin or solid cylinder screwed firmly into the same; and likewise to form a vent or touchhole by boring or drilling. The external surface of the cannon is then to be finished by turning the same in a lathe to the size and form required. It is then ready to receive the trunnions. The trunnions are made as follows: I form a hollow cylinder, hoop, ring, or band which I call the trunnion band, which for a cannon of the size that I have heretofore particularly described should be about nine inches long, one inch thick, and of an internal diameter about half an inch less than the external diameter of the cannon at the part over which it is to be placed. Upon the two opposite sides of this band I fix, by welding, two short cylinders, the end of each cylinder being united to the outside of the band. The operations necessary for forming the trunnion band and trunnions may be performed by hammers, swages, and other proper smiths tools in common use and constituting no part of my invention. The trunnion band with the two short cylinders united to it, as above described, and which form the trunnions, having been forged or formed are next to be finished by proper turning and other tools. A screw, or thread of a screw, is then to be formed upon the inside of the band. A corresponding screw or thread of a screw is then to be formed upon the outside of the body of the cannon at that part of the same which is to be covered by the trunnion band. The trunnion band is then screwed on to the body of the cannon in the same way that a nut is screwed on to a screw bolt, and secured in its place by a proper spline or key driven into a proper cavity made to receive it between the band and the body of the cannon. The spline or key is intended to prevent the band from turning around upon the cannon in the same way that a wheel is prevented from turning upon a shaft by like spline or key.

Having thus fully described the manner in which I combine and arrange the respective parts of the apparatus or machinery which I use in the making of wrought iron cannon of various kinds, what I claim therein as new, and desire to secure by Letters Patent is—

1. The manner in which I have combined and arranged the following parts, which are concerned in forming and welding together the pieces of which the gun or piece of ordnance is to be composed; namely the mold W, the hollow spindle H connected with the part R that supports the backing pin K, together with said backing pin, the spindle L on the end of the piston D, the mandrel M passing through said spindle and connected in the manner described with the hollow piston or follower D of a hydrostatic or other suitable press; the respective parts of this combination being operated upon and being made to coöperate with each other substantially in the manner and for the purpose herein set forth. And this I claim whether the individual parts be formed and acted upon precisely as herein represented or in any other way which is substantially the same in its results, effecting the same end by equivalent means.

2. I claim the manner of adapting the mold W to the varying taper of the gun that is to be formed, and to guns of different sizes, by the insertion of staves $i, i, i,$ of varying thickness within the mold of a machine for forming guns of wrought iron, as described.

DANL. TREADWELL.

Witnesses:
　THOS. P. JONES,
　GUY C. HUMPHRIES.